US010869794B2

(12) United States Patent
Lindquist et al.

(10) Patent No.: US 10,869,794 B2
(45) Date of Patent: Dec. 22, 2020

(54) REVERSIBLE SEATING MECHANISM WITH TILT LIMITING DEVICE

(71) Applicant: Sunrise Medical (US), LLC, Fresno, CA (US)

(72) Inventors: Steven L. Lindquist, Fresno, CA (US); Vasily G. Tsuber, Fresno, CA (US)

(73) Assignee: Sunrise Medical (US) LLC, Fresno, CA (US)

( * ) Notice: Subject to any disclaimer, the term of this patent is extended or adjusted under 35 U.S.C. 154(b) by 43 days.

(21) Appl. No.: 16/310,493

(22) PCT Filed: Jun. 19, 2017

(86) PCT No.: PCT/US2017/038178
§ 371 (c)(1),
(2) Date: Dec. 17, 2018

(87) PCT Pub. No.: WO2017/219036
PCT Pub. Date: Dec. 21, 2017

(65) Prior Publication Data
US 2019/0262199 A1  Aug. 29, 2019

Related U.S. Application Data

(60) Provisional application No. 62/351,363, filed on Jun. 17, 2016.

(51) Int. Cl.
*B60N 2/02* (2006.01)
*B60N 2/10* (2006.01)
(Continued)

(52) U.S. Cl.
CPC ........... *A61G 5/107* (2013.01); *A61G 5/1072* (2013.01); *A61G 5/1075* (2013.01); *A61G 5/14* (2013.01);
(Continued)

(58) Field of Classification Search
USPC ....... 248/415, 416, 417, 418, 419, 423, 157, 248/424, 425; 296/65.01, 65.06;
(Continued)

(56) References Cited

U.S. PATENT DOCUMENTS 4,487,452 A * 12/1984 Tanizaki ................ B60N 2/242
248/415
4,671,572 A * 6/1987 Young ...................... A47C 3/18
248/425

(Continued)

FOREIGN PATENT DOCUMENTS

CN          101890974 A    11/2010
DE      202010003884 U1     8/2010
(Continued)

OTHER PUBLICATIONS

PCT International Search Report—PCT/US2017/038178, dated Aug. 22, 2017.
(Continued)

*Primary Examiner* — Alfred J Wujciak
(74) *Attorney, Agent, or Firm* — MacMillan, Sobanski & Todd, LLC (57) ABSTRACT

A reversible seating mechanism includes a frame and a cross member pivotally supported on the frame for rotational movement in a plane generally parallel to the frame to define a tilt angle. A mounting plate is pivotally supported on the cross member for rotational movement in a plane generally parallel to the cross member to define one of a forward and rearward facing orientation. The mounting plate is moveable on the cross member to be oriented to the tilt angle. A tilt limiter restricts movement of the mounting plate between the forward and rearward facing orientations until the tilt
(Continued)

angle is adjusted to a preset angle. The tilt limiter limits a forward facing tilt angle to an angle less than a rearward tilt angle.

14 Claims, 7 Drawing Sheets

(51) Int. Cl.
  *A61G 5/10* (2006.01)
  *B62B 9/10* (2006.01)
  *B62B 9/12* (2006.01)
  *A61G 5/14* (2006.01)
(52) U.S. Cl.
  CPC ............... *B60N 2/02* (2013.01); *B62B 9/102* (2013.01); *B62B 9/104* (2013.01); *B62B 9/12* (2013.01); *B60N 2/10* (2013.01)
(58) Field of Classification Search
  USPC ............... 297/313, 314, 317, 344.21, 344.22
  See application file for complete search history.

(56) References Cited

U.S. PATENT DOCUMENTS

| | | | |
|---|---|---|---|
| 5,524,952 A * | 6/1996 | Czech | B60N 2/14 296/65.12 |
| 5,702,084 A * | 12/1997 | Carnahan | F16M 11/041 248/415 |
| 7,364,183 B2 | 4/2008 | Lee | |
| 8,205,945 B2 * | 6/2012 | Ma | B60N 2/14 248/349.1 |
| 8,505,957 B2 | 8/2013 | Bizzell et al. | |
| 8,657,311 B2 | 2/2014 | Li | |
| 2011/0304124 A1 | 12/2011 | Chen et al. | |
| 2016/0046314 A1 | 2/2016 | Zehfuss et al. | |

FOREIGN PATENT DOCUMENTS

| | | |
|---|---|---|
| EP | 0522783 A2 | 1/1993 |
| NL | 1032151 C2 | 1/2008 |

OTHER PUBLICATIONS

PCT Written Opinion of the ISA—PCT/US2017/038178, dated Aug. 22, 2017.

Supplementary European Search Report, EP18814269, dated Jan. 21, 2020.

EPO English machine translation of CN101890974A.

EPO English machine translation of DE202010003884U1.

* cited by examiner

Activate Tilt Lever to re-set seat angle to level.

Step 1: a) Press Rotate Button(1)
and
b) Rotate Plate until it stops at Tilt Limiter

Fig. 9

Step 2: a) Pull Release Pin
and
b) Rotate Tilt Limiter Forward

Fig. 10

Step 3: Finish Rotation of Plate

Fig. 11

REVERSIBLE SEATING MECHANISM WITH TILT LIMITING DEVICE

CROSS-REFERENCE TO RELATED APPLICATIONS

This application claims the benefit of U.S. Provisional Application No. 62/351,363, filed Jun. 17, 2016, the disclosure of which is incorporated herein by reference.

BACKGROUND OF THE INVENTION

This invention relates in general to chairs and tilt systems and more particularly to wheelchair and stroller seating systems. In at least one aspect, this invention relates to a Seat Mounting System that can be reversed to allow the seat to be mounted facing either forward or rearward, and at the same time activates a Tilt Limiting Device that relates to a mechanism that limits the tilt of the system in either the forward and/or rearward direction.

Strollers having seating systems that provide tilt and recline capabilities and are adjustable between forward and rearward facing orientations are known in the art. Many strollers provide the ability to adjust the attitude of the seat back relative to the seat bottom, i.e., recline adjustment, and adjust the attitude of the seat back and bottom as a unit relative to the frame, i.e., tilt. Some reversible seating systems require the seat to be removed from the mounting structure, reoriented by the attendant, and reinstalled to the mounting structure in the desired orientation. Other systems include a pivoting structure that can be locked and unlocked to swivel the seat relative to the frame. The tilt or recline attitude of the seats, however, must be independently adjusted when the seat is pivoted from, for example, a forward facing position to a rearward facing position. This adjustment is made to prevent a backward tilt angle from becoming a forward leaning position that feels uncomfortable and unstable to the occupant. This condition is particularly important in stroller systems intended for disabled children who have limited movement capabilities and require assistance in adjusting to a changed seating orientation.

Thus, it would be desirable to provide a stroller seating system that provides the ability to reset the tilt angle of the seat to a level or near level attitude as the assembly is swiveled from one facing direction to the other.

SUMMARY OF THE INVENTION

This invention relates to a Seat Mounting System that supports a seat and can be reversed to allow the seat to be mounted facing either forward or rearward, and at the same time activates a Tilt Limiting Device that relates to a mechanism that limits the tilt of the system in either the forward and/or rearward direction. In one aspect of the invention, the Seat Mounting System includes a Reversible Mounting Plate that can be positioned relative to the frame of the stroller in a forward facing or rearward facing orientation. As the Mounting Plate is rotated, a Tilt limiter is activated to limit the forward and rearward tilt angle of the Mounting Plate.

In one embodiment of the invention, a reversible seating mechanism comprises a frame, a cross member, a mounting plate and a tilt limiter. The cross member is pivotally supported on the frame for rotational movement in a plane generally parallel to the frame to define a tilt angle. The mounting plate is pivotally supported on the cross member for rotational movement in a plane generally parallel to the cross member to define one of a forward and rearward facing orientation, the mounting plate being oriented to the tilt angle. The tilt limiter is configured to restrict movement of the mounting plate between the forward and rearward facing orientations until the tilt angle is adjusted to a preset angle. According to one aspect of the embodiment, the preset angle can be a generally level or near level orientation relative to the ground.

In another embodiment of the invention, the reversible seating mechanism comprises a frame, a cross member, a mounting plate and a tilt limiter. The cross member is pivotally supported on the frame for rotational movement in a plane generally parallel to the frame to define a tilt angle. The mounting plate is pivotally supported on the cross member for rotational movement in a plane generally parallel to the cross member to define one of a forward and rearward facing orientation, the mounting plate being oriented to the tilt angle. The tilt limiter includes a rocker actuator that engages a plunger pin connected to the mounting plate, the rocker actuator inhibiting rotation of the mounting plate from one of the forward and rearward facing orientations to the other when the tilt limiter is in a first position and permitting rotation of the mounting plate to the other of the forward and rearward facing orientation when the tilt limiter is moved to a second position.

In an aspect of this embodiment, the first position of the tilt limiter limits a forward tilt angle to an angle less than a rearward tilt angle and inhibits rotation of the mounting plate to the rearward facing orientation. The second position of the tilt limiter permits movement of the mounting plate to the rearward facing orientation and limits the forward facing tilt angle to an angle less than the rearward tilt angle In another aspect of this embodiment, the first position of the tilt limiter limits a forward tilt angle to an angle less than a rearward tilt angle and the forward tilt angle is in a range of about 0 degrees to about 5 degrees and the rearward tilt angle is in a range of about 0 degrees to about 30 degrees.

In yet another aspect of this embodiment, the rocker actuator defines two intersecting surfaces. These may be generally planar intersecting surfaces that contact the plunger pin such that one surface permits movement of the plunger pin toward the intersection and the other surface inhibits movement of the mounting plate to the other of the forward and rearward facing orientation when the tilt limiter is in the first position. Additionally, in operation when the plunger pin contacts the intersection point of the two planar surfaces and the tilt limiter is then moved to the second position, the mounting plate is permitted to move to the other of the forward and rearward facing orientation.

In another embodiment of the invention, the reversible seating mechanism comprises a frame, a cross member, a mounting plate and a tilt limiter. The cross member is pivotally supported on the frame for rotational movement in a plane generally parallel to the frame to define a tilt angle. The mounting plate is pivotally supported on the cross member for rotational movement in a plane generally parallel to the cross member to define one of a forward and rearward facing orientation, the mounting plate being oriented to the tilt angle. The tilt limiter is configured to restrict movement of the mounting plate between the forward and rearward facing orientations until the tilt angle is adjusted to a preset angle.

According to one aspect of this embodiment, the mounting plate includes a rotation release lever that prevents rotation of the mounting plate parallel to the cross member in a locked position and permits rotation of the mounting plate parallel to the cross member in the unlocked position.

According to another aspect of this embodiment, the cross member includes a first cross member pivot support and a mechanical lock assembly that biases cross member to move the mounting plate into the preset angle. The tilt limiter has a first position that inhibits rotation of the mounting plate from one of the forward and rearward facing orientations to the other and a second position that permits further rotation of the mounting plate to the other of the forward and rearward facing orientation.

According to yet another aspect of this embodiment, the tilt limiter has a first position that inhibits rotation of the mounting plate from one of the forward and rearward facing orientations to the other and a second position that permits further rotation of the mounting plate to the other of the forward and rearward facing orientation. The first position of the tilt limiter inhibits rotation of the mounting plate to the rearward facing orientation and limits the forward facing tilt angle to an angle less than the rearward tilt angle and wherein the second position of the tilt limiter permits movement of the mounting plate to the rearward facing orientation and limits the forward facing tilt angle to an angle less than the rearward tilt angle.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figures 1A, 1B:
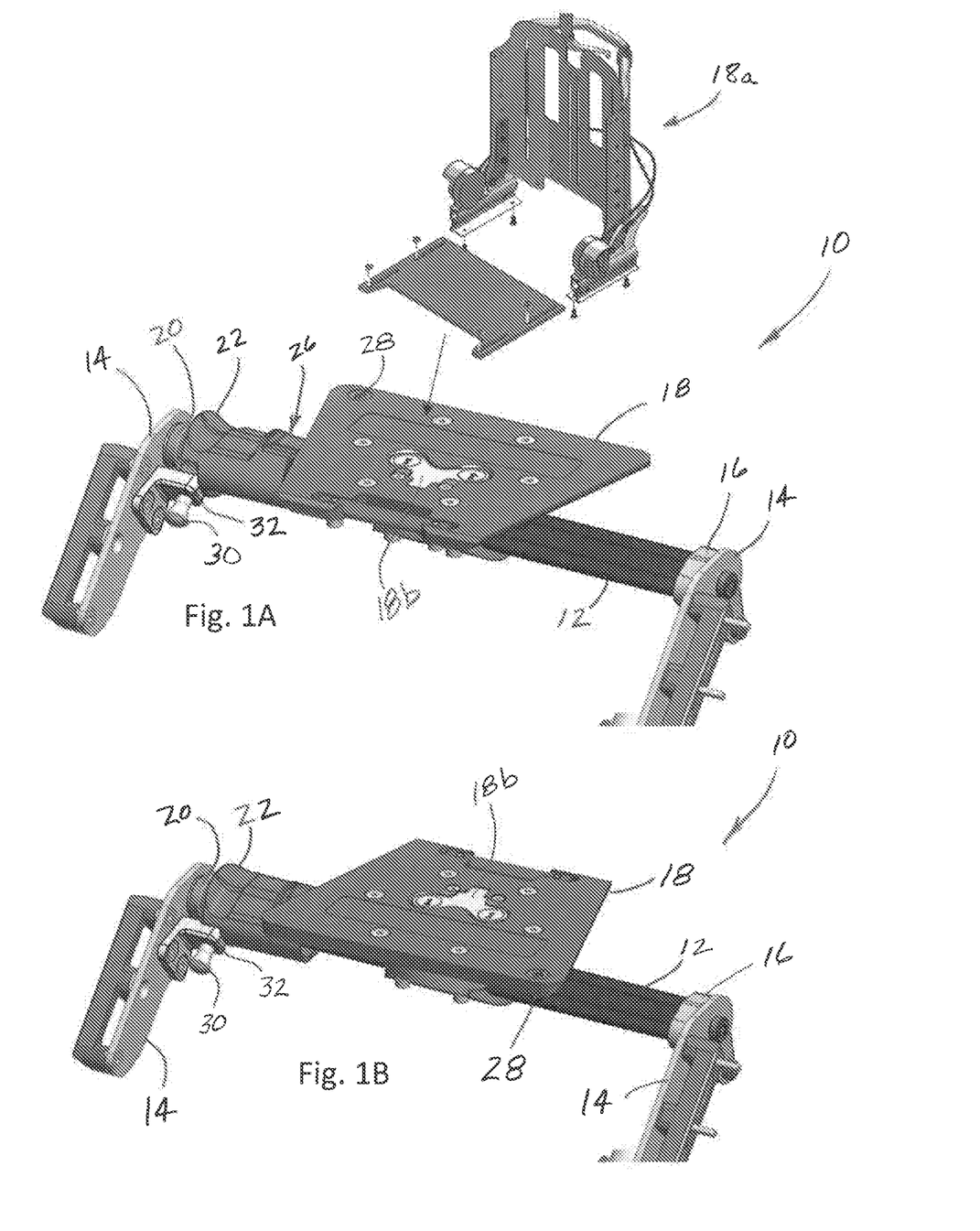
FIG. 1A is a perspective view of a seating system having a Mounting Plate oriented in the forward facing direction, and a Tilt Limiter positioned to limit tilt of the Mounting Plate in its forward direction.
FIG. 1B is a perspective view of the Mounting Plate of FIG. 1A oriented in a rearward facing direction, and the Tilt Limiter positioned to limit tilt of the Mounting Plate in its forward direction.
Figure 2:
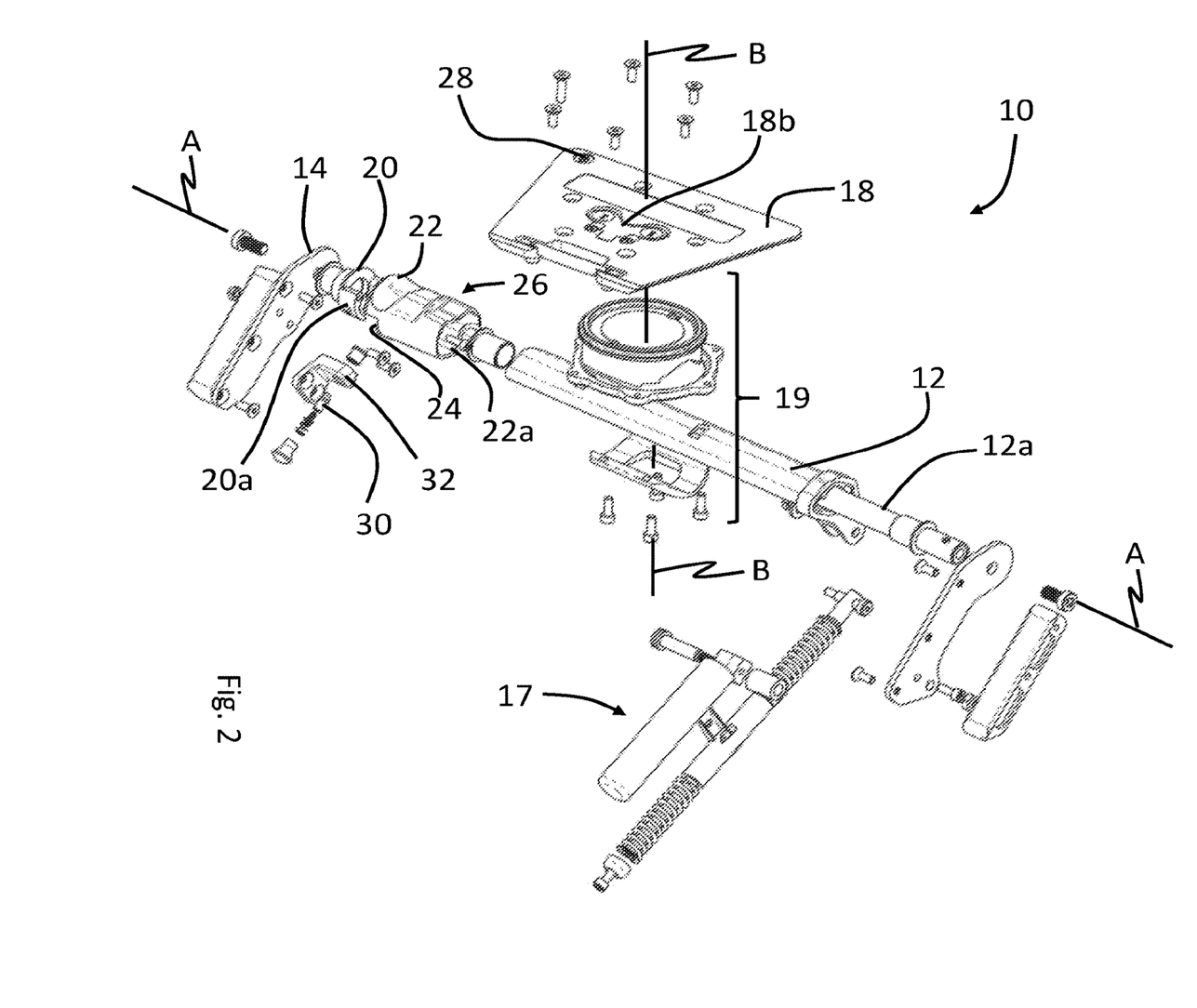
FIG. 2 is an exploded perspective view of the seating system of FIG. 1A
Figure 3:
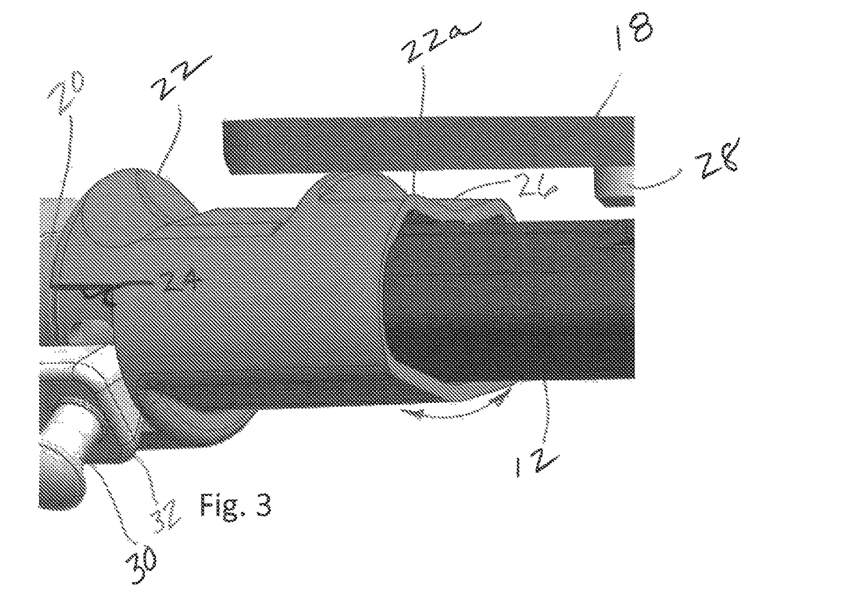
FIG. 3 is an enlarged view of the Tilt Limiter position when the Mounting Plate is facing forward as in FIG. 1A.
Figure 4:
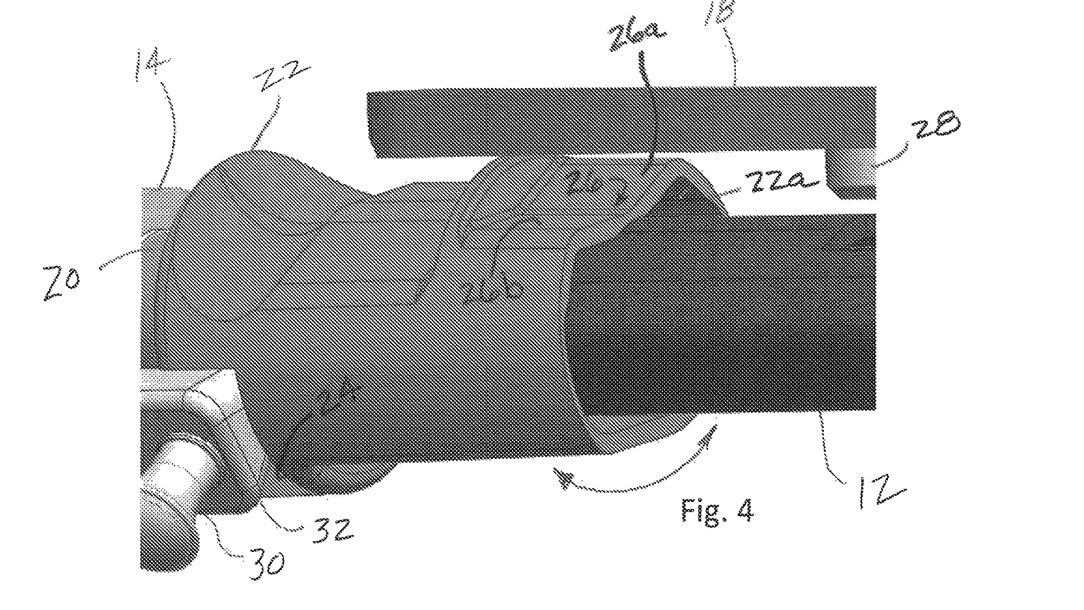
FIG. 4 is an enlarged view of the Tilt Limiter position when the Mounting Plate is facing rearward as in FIG. 1B.
Figure 5:
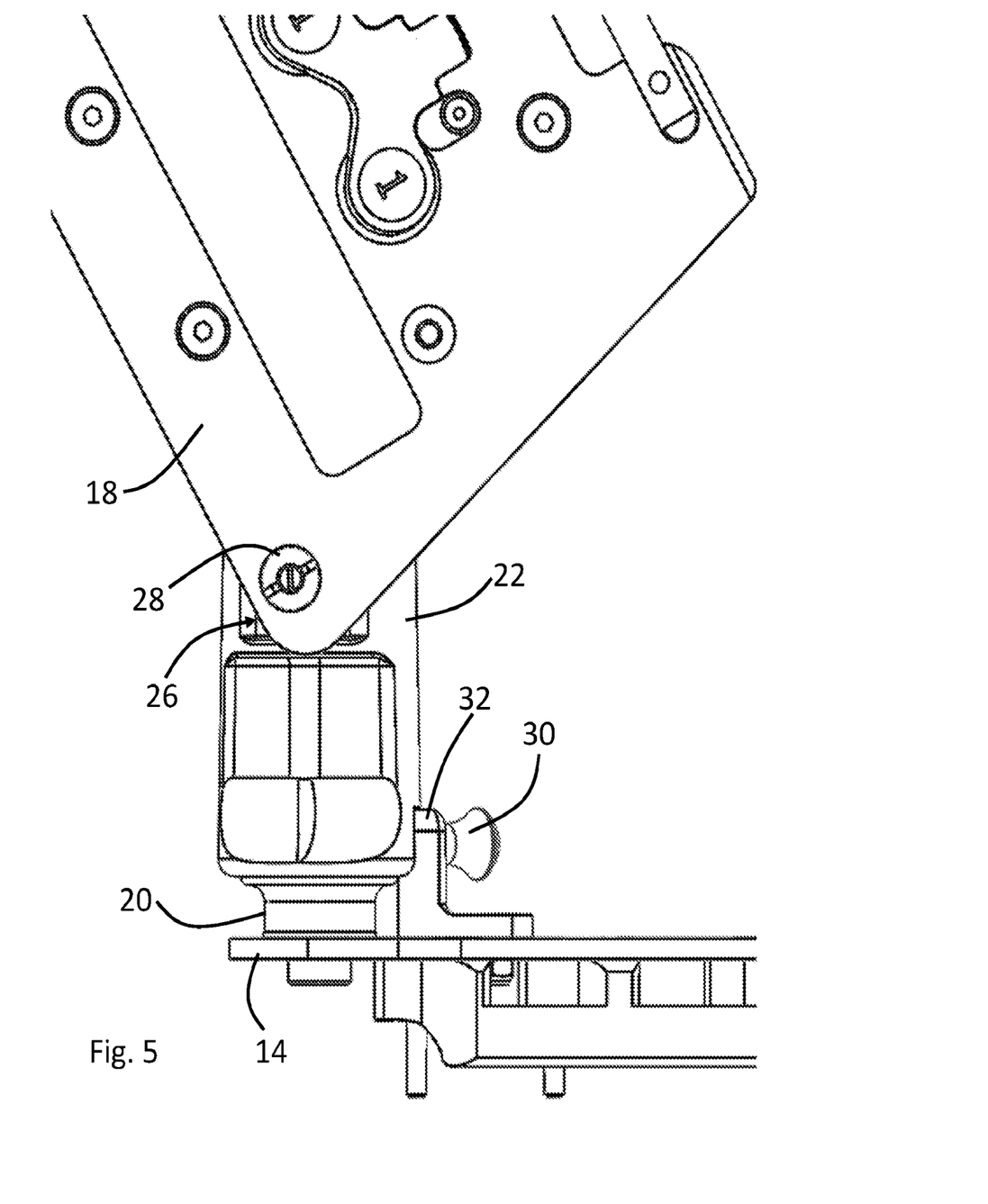
FIG. 5 is a plan view showing an intermediate position of the Mounting Plate during movement from forward facing to rearward facing.
Figure 6:
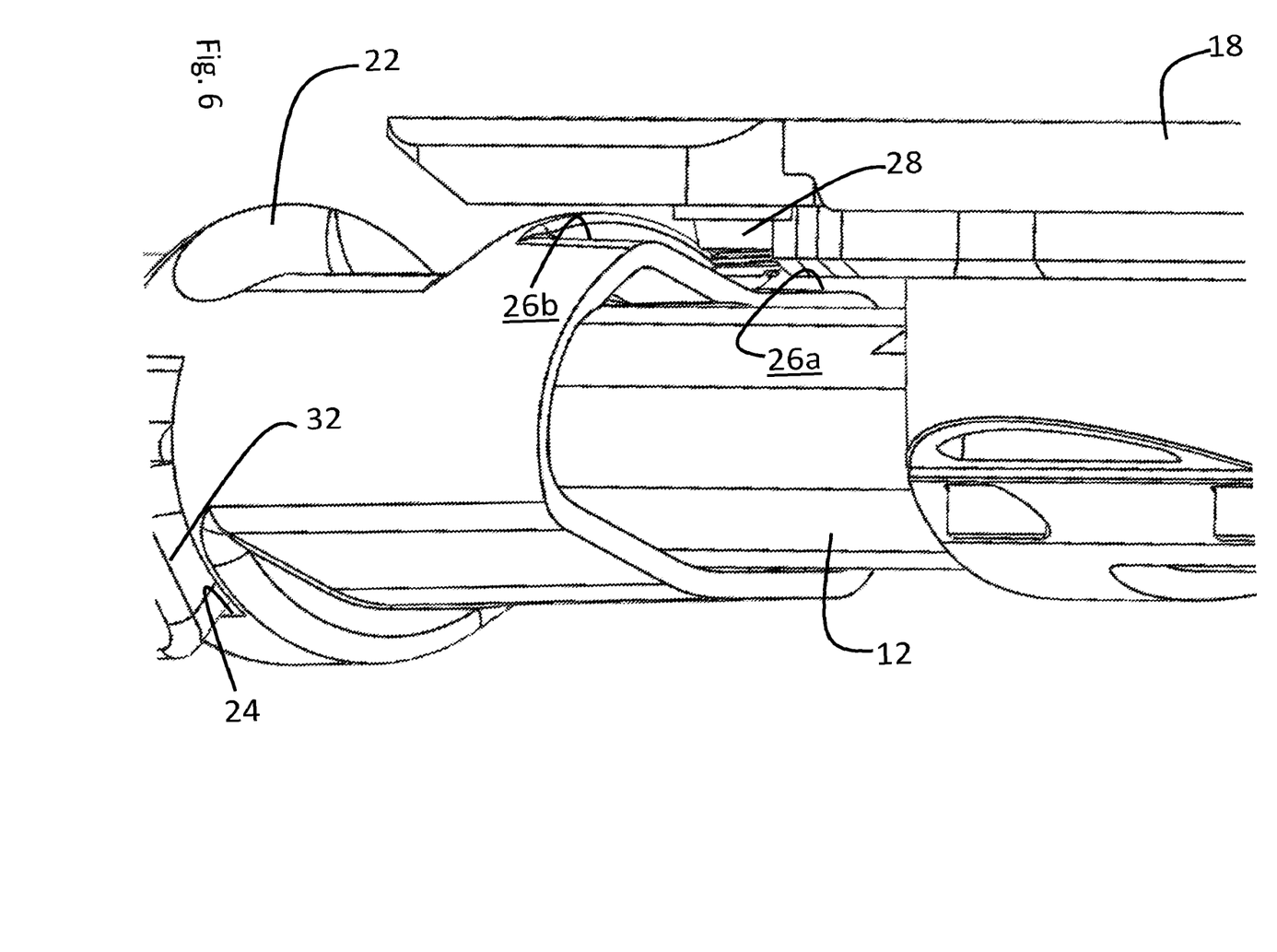
FIG. 6 is an enlarged view showing a Plunger Pin on the Mounting Plate, being stopped from rotating further by the Tilt Limiter.

Referring now to the drawings, there is illustrated in FIGS. 1A, 1 B, and 2 a seating assembly shown generally at 10. Though illustrated as a seating assembly configured for use with a stroller, the seating assembly may be suitable for any conveyance such as, for example, a wheelchair. The seating assembly 10 includes a cross member 12 extending between end frame supports 14. The cross member 12 is illustrated as a tubular element having a shaped profile that selectively interacts with mating shaped profiles in order to restrict or limit rotational movement of the cross member 12 relative to the end frame supports 14. As shown in FIG. 2, the shaped profile of the cross member 12 has a generally diamond shaped cross section. Though illustrated as diamond shaped, other torque transmitting profiles may be used as well.

As also shown in FIG. 2, a support tube 12a extends within the cross member 12 and through a first cross member pivot support 16. In the illustrated embodiment, the first cross member 16 includes a matching, mating profile shape similar to the shaped profile of cross member 12. The support tube 12a is connected to the end frame support 14 adjacent to the first cross member pivot support 16. The first cross member pivot support 16 moves in unison with the cross member 12. In one embodiment, the first cross member pivot support 16 accommodates a tilt movement of the cross member 12 in a plane generally perpendicular to a seat mounting plate 18. The tilt movement is a rotational movement of the cross member 12 relative to the frame end supports 14 about an axis "A", shown in FIG. 2. The first cross member pivot support 16 includes a reaction arm 16a that connects to a mechanical lock assembly 17. The mechanical lock assembly 17 biases the seating assembly or the seat mounting plate 18 into a level or neutral tilt position relative to the support surface. A lever or other actuator (not shown) selectively releases the mechanical lock assembly to return a previously tilted position of the seat mounting plate 18 to the neutral position.

The seat mounting plate 18 is configured to support a seat 18a (having a seat back and seat base) on the surface thereof. The mounting plate 18 is illustrated having a rotation release lever 18b to permit the mounting plate 18 to be selectively rotatable about an axis "B", shown in FIG. 2, between a forward facing position, shown in FIG. 1A and a rearward facing position, shown in FIG. 1B, relative to the end frame supports 14. The forward facing orientation is where the occupant of the seat 18a is facing in the forward direction or direction of travel. The rearward facing direction is where the occupant is facing the attendant or has their back to the forward direction of travel. Alternatively, the release lever 18b may be remotely actuated to permit rotation of the mounting plate 18. The mounting plate 18 is secured to the cross member by a turntable clamp assembly 19. The turntable clamp assembly 19 secures the mounting plate to the cross member for concurrent tilt movement about axis A. The upper portion of the turntable clamp assembly permits selective movement of the mounting plate 18 when the rotation release lever 18b is actuated.

A second cross member pivot support 20 is connected to the opposite end frame support 14. The second cross member support 20 supports the cross member 12 and a tilt limiter 22 for selective rotational movement. The second cross member support 20 includes a locking tab and aperture 20a. The support tube 12a also extends through the second cross member support 20 and tilt limiter 22 and is connected to the other frame end support 14. During tilt movement of the mounting plate 18, and in certain embodiments the seat 18a which may be connected together as an assembly, the cross member 12 rotates relative to the pivot supports 16 and 20. The tilt limiter 22 is permitted to rotate through a limited angle defining a forward tilt angle and a rearward tilt angle. The forward tilt angle is the angle causing the occupant to lean forward from a generally upright, seated position. The rearward tilt angle is the angle causing the occupant to lean back in the seat with the seat back and seat base in a generally fixed relative orientation. Further, a recline position is where the seat back is moved relative to the seat base. In one embodiment, the forward tilt angle may be in a range from 0 (generally parallel to the ground) to 5 degrees and the rearward tilt angle in a range from 0 to 30 degrees. As will be explained below, the tilt limiter 22 prohibits rotational movement of the mounting plate 18 unless the previous tilt position has been reset to a neutral tilt or near neutral tilt position. Once the tilt position of the mounting plate 18 is returned to the neutral position, the tilt limiter 22 can be actuated to permit the remainder of the swivel movement to be completed to achieve either the forward or rearward seat facing adjustment.

As shown in FIGS. 2-4 and 6, the tilt limiter 22 includes a complementary profile to cross member 12 that permits limited rotational movement of the tilt limiter 22 relative to the cross member 12. The tilt limiter 22 includes a range slot 24 that defines the permitted amount of rotational tilt movement of the mounting plate 18. The tilt limiter 22 further includes a rocker actuator 26 illustrated as having two planar surfaces 26a and 26b positioned at a relative angle to one another. The mounting plate 18 includes a plunger pin 28 that is oriented to contact the rocker slot 24. As the mounting plate 18 is rotated in the plane parallel to the cross member 12, the plunger pin 28 rides over the first planar surface 26a. In one embodiment, the first planar surface 26a may be generally parallel to the surface of the mounting plate 18 in the forward position. The complementary profile of the tilt limiter 22 is such that when the cross member 12 and mounting plate 18 are in the neutral position, the tilt limiter can be rotated such that the plunger pin 28 enters one of the planar surfaces 26a or 26b.

Figure 7:
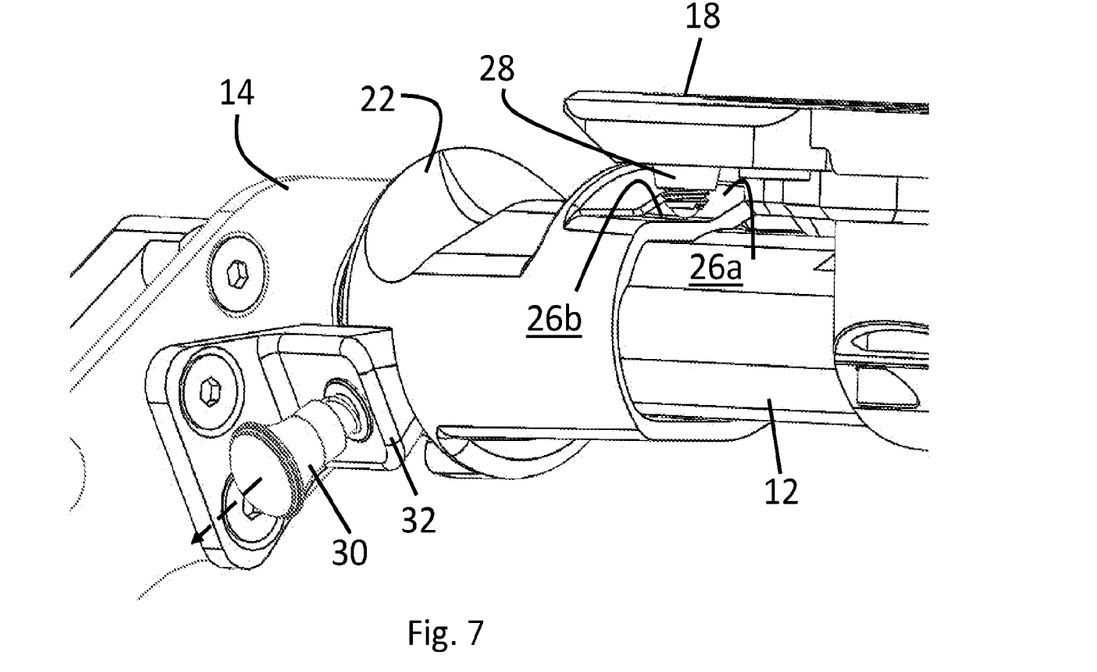
FIG. 7 is an enlarged view showing a Release Pin on the Tilt Limiter in an unlatched position permitting the Tilt Limiter to be rotated to a rearward position.
Figure 8:
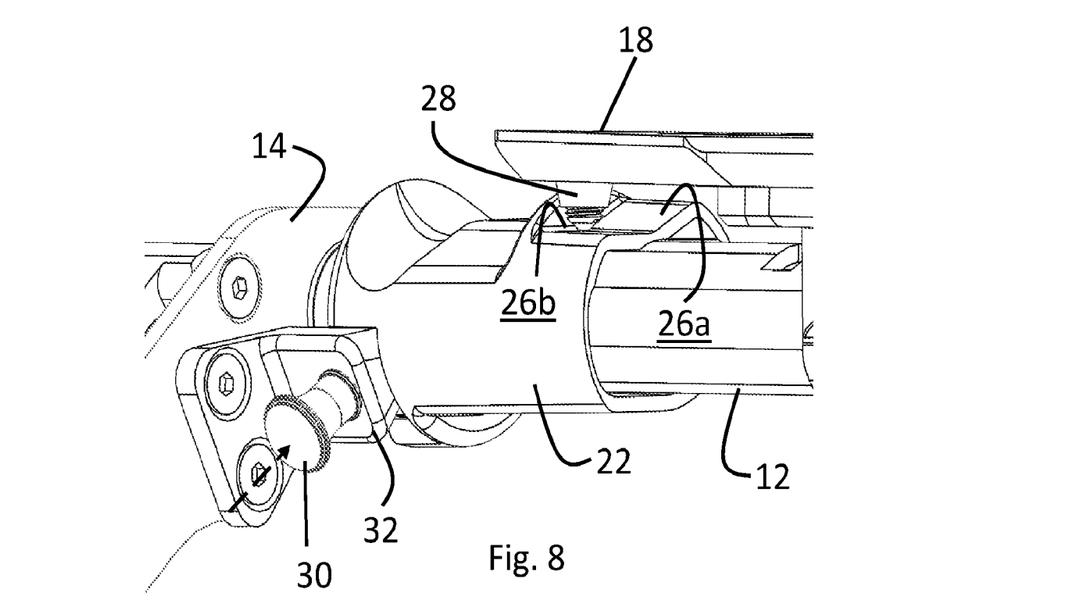
FIG. 8 is an enlarged view showing the Release Pin of FIG. 7 in a locked position, the Tilt Limiter rotated to its rearward position, and the Mounting Plate continuing in its rotation to the rearward facing orientation.
Figure 9:
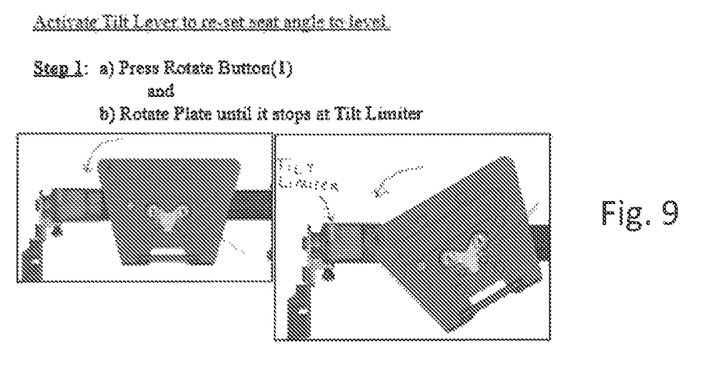
FIG. 9 illustrates a first method step for re-orienting the Mounting Plate and Tilt Limiter of FIG. 1A.
Figure 10:
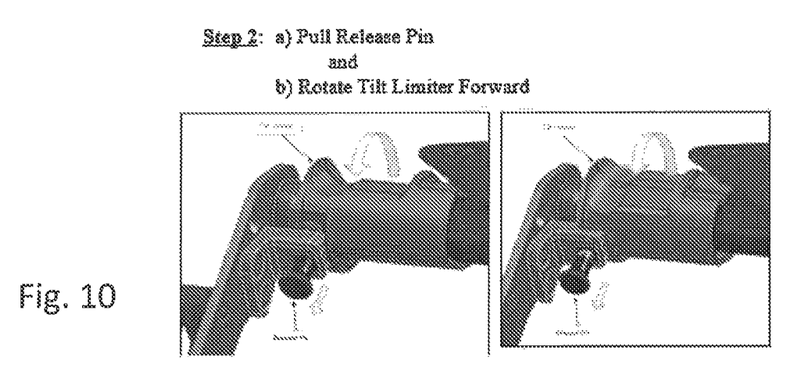
FIG. 10 illustrates a second method step for re-orienting the Mounting Plate and Tilt Limiter of FIG. 1A.
Figure 11:
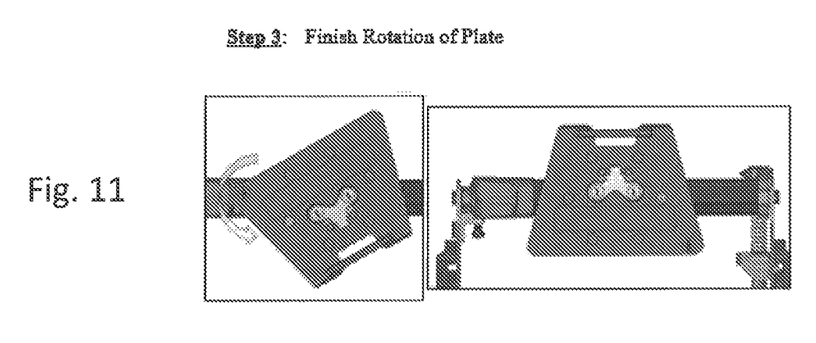
FIG. 11 illustrates a third method step for re-orienting the Mounting Plate and Tilt Limiter of FIG. 1A.

Pulling the release pin 30 (as shown by the arrow illustrated in FIG. 7) permits the tilt limiter 22 to rotate about the cross member 12. The tilt limiter 22 is permitted to selectively rotate about axis A relative to the end frame supports 14 by way of a release pin 30 which is supported on the end frame support 14 by a mounting block 32. When the plunger pin 28 reaches the intersection of the planar surfaces 26a and 26b, the tilt limiter 22 prevents further rotational movement of the mounting plate 18 until the release pin 30 is unlocked. Once in the unlocked position, the tilt limiter can be rotated so that the plunger pin 28, which is located at the intersection of planar surfaces 26a and 26b, is permitted to pass over the other of the planar surfaces 26a and 26b after rotation of the tilt limiter 22. As the plunger pin 28 exits the rocker actuator 26, the mounting plate 18 may be rotated to the desired facing position. The release pin 30, and in certain embodiments the mounting block 32, contact the range slot 24 to define the limit of tilt angle for the mounting plate 18 as it is pivoted to the rearward facing position. In certain embodiments, this angular range limit is the same as the forward tilt angle limit.

Rotational movement of the tilt limiter 22 when the plunger pin 28 is at the intersection of the two planar surfaces 26a and 26b requires the tilt angle of the mounting plate 18 to be reset to the neutral position, a generally level or near 0 degree orientation. Thus, prior to the seat assembly and mounting plate 18 being moved or swiveled from a forward facing position to a rearward facing position, the tilt or recline angle of the seat is reset to a generally level position during the swiveling operation.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A reversible seating mechanism for stroller or wheelchair, comprising:
   a frame;
   a cross member pivotally supported on the frame for rotational movement in a plane generally parallel to the top of frame to define a tilt angle;
   a mounting plate for supporting a seat, pivotally supported on the cross member for rotational movement in a plane generally parallel to the top of cross member to define one of a forward and rearward facing orientation, the mounting plate being oriented to the tilt angle; and
   a tilt limiter having a rocker actuator that engages a plunger pin connected to the mounting plate, the rocker actuator inhibiting rotation of the mounting plate from one of the forward and rearward facing orientations to the other when the tilt limiter is in a first position and permitting rotation of the mounting plate to the other of the forward and rearward facing orientation when the tilt limiter is moved to a second position such that movement of the mounting plate is restricted between the forward and rearward facing orientations until the tilt angle is adjusted to a preset angle.

2. The reversible seating mechanism of claim 1 wherein the preset angle is a generally level or near level orientation relative to ground.

3. The reversible seating system of claim 1 wherein the first position of the tilt limiter limits a forward tilt angle to an angle less than a rearward tilt angle.

4. The reversible seating system of claim 3 wherein the first position of the tilt limiter inhibits rotation of the mounting plate to the rearward facing orientation.

5. The reversible seating system of claim 4 wherein the second position of the tilt limiter permits movement of the mounting plate to the rearward facing orientation and limits the forward facing tilt angle to an angle less than the rearward tilt angle.

6. The reversible seating system of claim 3 wherein the forward tilt angle is in a range of about 0 degrees to about 5 degrees and the rearward tilt angle is in a range of about 0 degrees to about 30 degrees.

7. The reversible seating system of claim 1 wherein the rocker actuator defines two intersecting surfaces.

8. The reversible seating system of claim 7 wherein the two intersecting surfaces are generally planar intersecting surfaces that contact the plunger pin such that one surface permits movement of the plunger pin toward the intersection and the other surface inhibits movement of the mounting plate to the other of the forward and rearward facing orientation when the tilt limiter is in the first position.

9. The reversible seating system of claim 8 wherein when the plunger pin contacts the intersection and the tilt limiter is then moved to the second position, the mounting plate is permitted to move to the other of the forward and rearward facing orientation.

10. The reversible seating system of claim 1 wherein the mounting plate includes a rotation release lever that prevents rotation of the mounting plate parallel to the cross member in a locked position and permits rotation of the mounting plate parallel to the cross member in the unlocked position.

11. The reversible seating system of claim 1 wherein the cross member includes a first cross member pivot support and a mechanical lock assembly that biases cross member to move the mounting plate into the preset angle.

12. The reversible seating system of claim 11 wherein the tilt limiter has a first position that inhibits rotation of the mounting plate from one of the forward and rearward facing orientations to the other and a second position that permits further rotation of the mounting plate to the other of the forward and rearward facing orientation.

13. The reversible seating system of claim 1 wherein the tilt limiter has a first position that inhibits rotation of the mounting plate from one of the forward and rearward facing orientations to the other and a second position that permits further rotation of the mounting plate to the other of the forward and rearward facing orientation.

14. The reversible seating system of claim 13 wherein the first position of the tilt limiter inhibits rotation of the mounting plate to the rearward facing orientation and limits a forward facing tilt angle to an angle less than a rearward tilt angle and wherein the second position of the tilt limiter permits movement of the mounting plate to the rearward facing orientation and limits the forward facing tilt angle to an angle less than the rearward tilt angle.

* * * * *